Patented Apr. 14, 1931

1,800,295

UNITED STATES PATENT OFFICE

HERBERT HÖNEL, OF KLOSTERNEUBURG-WEIDLING, NEAR VIENNA, AUSTRIA, ASSIGNOR TO BECK, KOLLER & COMPANY, OF DETROIT, MICHIGAN

CONDENSATION PRODUCT AND PROCESS FOR PREPARING SAME

No Drawing. Application filed September 9, 1927, Serial No. 218,587, and in Austria August 6, 1927.

It is known that, in general, phenols and formaldehyde when treated with alkaline contact agents, furnish condensation products which, according to the conditions employed, are either resinous or merely oily to viscous, and pass over, at higher temperatures, into the infusible and insoluble state. The employment of acid contacts furnishes, under certain conditions, fusible and soluble resins which, as is known, find application in the varnish industry.

It has now been ascertained that by condensing aldehydes and phenols containing an alkyl radicle in the $p$-position, resinous products can be obtained which are completely soluble in benzine, and therefore also in oils, and possess highly valuable properties. Such phenols are, in part, easily prepared owing to the special reactivity of the $p$-hydrogen atom in the molecule; for example by heating phenol with higher alcohols in presence of dehydration agents such as anhydrous zinc chloride, magnesium chloride or primary alkali sulphates (see, inter alia, Ber. d. Deutschen Chem. Ges. vol. 14, p. 1842 et seq., vol. 15, p. 150 et seq., vol. 16, p. 792, vol. 17, p. 669, vol. 26, p. 1646 and German Patent No. 17311). They can also be prepared from phenol by reactive haloids in presence of agents capable of splitting off halogen hydrides (see Ber. 15, p. 152; 32, p. 2428; German Patent 18977). They can also be obtained with advantage in a circuitous manner, for example from alkylated benzol through its sulphonic acid, or from the corresponding amide, under which conditions $p$-substituted phenols alone are obtained in nearly all cases.

A process for the production of resins is known in which phenols are first condensed with unsaturated hydrocarbons, by the Koenigs method (Ber. vol. 23, p. 3145; vol. 24, p. 179 and 3889 and vol. 25, p. 2649), and then with aldehydes. The first condensation also furnishes $p$-substituted phenols, this reaction, however, being incomplete and the yield poor, especially in the case of purely aliphatic hydrocarbons. Thus, with the equimolecular quantity of phenol, isoamylene furnishes only 6% of the theoretical yield, the remainder of the phenol remaining uncombined. The resins obtained by the above process are also soluble only in benzol, but insoluble in benzine. On the other hand, however, according to the present process, the $p$-butylphenol obtained from isobutylalcohol and phenol, for example, furnishes with formaldehyde—notwithstanding the smaller aliphatic radicle—a resin which is soluble in benzine in all proportions. As a matter of course, acetaldehyde, for example, furnishes with the same substance resin which is not less soluble in benzine. Particularly valuable materials are the purified phenols with a $p$-substituted tertiary radicle, since they furnish with aldehydes very pale resins which are fast to light. Moreover, in order to obtain, with aldehydes, resins of high melting point and satisfactorily soluble in benzine, it is not unconditionally necessary to purify the phenols, prepared in the specified manner, from various by-products, such as those of ethereal character. The starting materials may also consist of phenol mixtures such as crude cresol, it being advisable to take the proportion of phenol and $m$-cresol into consideration. In such case, the entire reaction mixture, together with the components ($p$-cresol in particular) which do not enter into the reaction, can be used in the condensation treatment, resins soluble in benzine being nevertheless obtained. The substances (alcohols, haloids, etc.) serving for the substitution of the $p$-hydrogen atom in the phenol may be used in an unrefined and mixed condition. The substituents may be purely aliphatic or hydroaromatic.

In the acid condensation of formaldehyde with these $p$-substituted phenols, a certain analogous behaviour with that of their simplest representative, $p$-cresol, is displayed. Almost equimolecular amounts may be used without fear of producing an infusible resin; whereas phenol and $m$-cresol in particular must be used in somewhat considerable excess in order to prevent this risk.

In the case of alkaline contact agents, the said $p$-substituted phenols behave in a very similar manner to $p$-cresol during condensation with formaldehyde. They can be condensed at different temperatures in the presence of varying amounts of alkali, ammonia, etc., with varying amounts of formaldehyde. According to the conditions, oily to solid masses, clear resins or infusible products are obtained. Equimolecular amounts of formaldehyde, or even up to 2 molecules can be taken up at lower temperatures. The method adopted in such case is to dissolve the phenol substance in alkalis and leave it in contact with aqueous formaldehyde at a moderate temperature for some time. Even considerably less than equimolecular proportions of alkali will suffice provided uniform solution of the components is effected, the application of warmth in the initial stage being necessary. The reaction product is finally thrown down from the alkaline solution by means of any acid. The oily or resinous, and still fusible, products may be placed in moulds and transformed into very hard infusible and insoluble resins by the application of heat, preferably accompanied by pressure. The products prepared with more than an equimolecular proportion of formaldehyde become, under this treatment, harder and more elastic than those prepared with only equivalent amounts. Such an excess of formaldehyde is also very useful for the purposes described in the next paragraph. The transition into the infusible state proceeds more slowly than with the known products obtained from phenol and its low homologues. The resinous, still fusible products are just as soluble in benzine and oil as the resins prepared from the same components with acid agents. In some cases, the products which have become infusible and insoluble are still capable of swelling in certain solvents, such as mixtures of alcohol and benzol.

Even the slower rate of resinification and other differences in behaviour as compared with the known similar products, enlarge the sphere of possible application. Thus, for example, the transition into the insoluble form when heated can be entirely prevented by a whole series of substances, even when operating with already viscous products prepared with an excess of formaldehyde, provided such substances be present in not too small amount. Such substances comprise all possible artificial and natural, acid neutral or neutralized resins, waxes, fatty oils, etc. Even with fairly small amounts of the said condensation products, such substances often undergo highly valuable modifications of their physical and chemical properties, such as melting point, hardness, viscosity, resistance to external influences, etc. The viscosity of fatty oils in more or less extensively increased. A very useful effect can be obtained with raw wood oil, for example, inasmuch as the incorporation of merely small amounts of the said products deprives it of its known undesirable drying character, and produces a clear, but very quick-drying film of great hardness and elasticity. It is known, indeed, that coumarone resin for example can be worked up, in association with powdered infusible resin prepared from $m$-cresol and formaldehyde with the aid of hydrochloric acid, into a resin soluble in a mixture of benzol and alcohol. The present process relates to intermediates produced by alkaline means; but resins soluble in benzine and oils can also be easily prepared from coumarone resin which is soluble in benzine. It is also known to increase the melting point and hardness of natural acid resins (colophony) by melting them with condensation products of the phenol-formaldehyde series which becomes infusible per se, whilst at the same time preventing the transition of said condensation products into the infusible form. It is, however, entirely new to work up neutralized, namely esterified colophony, or more or less neutral natural resins, with similar products in the specified manner.

With resins, soluble in benzine, such as colophony, glycerol ester or dammar, products soluble in benzine can be obtained. This is also the case when the condensation product employed to act on the resin is prepared from a phenol substituted in the $p$-position by an alkyl radicle or also by an arylalkyl radicle. The phenol substance may also consist of $p$-cresol or $p$-benzylphenol. The condensation products from $p$-cresol have hitherto been employed to act solely on acid natural resins.

Intermediate products more suitable for the aforesaid action on waxes, fatty oils, etc., are those obtained from $p$-substituted phenols with a larger aliphatic radicle. These can also be worked up with melts of resins and fatty oils, or with resins dissolved in inert solvents; and the incorporation can also be effected at increased or diminished, instead of ordinary, pressure, or in presence of inert gases.

The resins obtained by the acid method also can be melted with other artificial or natural, unaltered or more or less altered resins soluble in oil, such as coumarone resin, colophony, resin esters, resinates, fused copal, etc.

For the sake of completeness, it may be mentioned that the condensation of known $p$-substituted phenols can also be effected with neutral contact agents, or entirely without same; only the operation generally proceeds far more slowly. Formaldehyde may also be replaced by its derivatives, such as hexamethylenetetramine, etc.; and acetaldehyde by paraldehyde.

*Example 1*

150 grms. of $p$-tertiarybutylphenol, prepared according to the Liebmann method (Ber. 14, p. 1842 and 15, p. 150) from isobutyl alcohol, phenol and zinc chloride, or in any other way, are heated to boiling with 95 grms. of 30% formaldehyde, in presence of 10 grms. of concentrated hydrochloric acid, for 8-10 hours under a reflux condenser. Finally, the aqueous liquid is separated from the condensation product (which is already almost solid at boiling temperature), and the latter is dehydrated by heating. A nearly water-white resin is obtained, of high melting point, very fast to light, and soluble in benzine and the like in any proportion.

Example 2

108 grms. of cresol American U. S. P., 80 grms. of cyclohexanol and 150 grms. of zinc chloride are heated at 180° for ¾ of an hour. Water is added after cooling, and the reaction product is separated from the aqueous solution of zinc chloride, being thereafter condensed (after having been distilled) with 40 grms. of paracetaldehyde with the aid of strong mineral acids. The water is finally eliminated and the resin is preferably freed from any uncondensed substances, in a current of steam. The resin is of high melting point, pale colour and soluble in benzine.

Example 3

82 grms. of $p$-tertiary-amylphenol (prepared for example from equimolecular proportions of phenol and tertiary amyl chloride, with a little $AlCl_3$) are dissolved to a clear solution in 90 grms. of 30% formaldehyde and 75 cc. of 3n-NaOH, by gentle warming. The charge is maintained at 50-55° C. for about 24 hours, and the viscous oily reaction product is precipitated by any acid, separated from the supernatant aqueous liquid and dried in the water bath. When placed in moulds it can be transformed, under pressure (in autoclaves), into a very hard, infusible resin. Before and after this treatment it is extremely fast to light.

Example 4

75 grms. of $p$-tertiary-butylphenol are condensed for several hours at 100° C. with 50 grms. of 30% formaldehyde and 7.5 grms. of concentrated ammonia, until a clear, viscous resin has been formed, which can easily be separated from the aqueous liquid. It is of a pale lemon-yellow colour, and is soluble in benzine and the like in all proportions. On being heated, it passes over into the infusible and insoluble form.

Example 5

20 grms. of the still moist product obtained as in Example 3 are gradually introduced into 100 grams of fused coumarone resin (soluble in benzine and with the melting point 50-55° C.), the temperature being finally raised to 200° C. The resulting resin which, if carefully prepared, is pale and soluble in benzine, melts at about 20° C. higher than the originating resin.

Example 6

100 grms. of purified Montan wax are treated in the same way as the above coumarone resin. The resulting wax has a considerably higher melting point, and is also much tougher and harder.

Example 7

100 grms. of wood oil are treated with 12 grms. of an alkali-condensed product of $p$-tertiary-butylphenol and formaldehyde, the temperature being finally raised to about 200° C. for a short time. The resulting product has the viscosity of thin stand oil and, when mixed with a suitable amount of drier, dries in about an hour (also in the warm) to a clear film of excellent properties.

Example 8

100 grms. of colophony-glycerol ester, with an acid value below 8 are melted with 25 grms. of a viscous oily condensation product obtained from $p$-benzylphenol and formaldehyde in presence of alkali. The $p$-benzylphenol is prepared by the action of molecular quantities of phenol and benzyl chloride in presence of zinc chloride. The fusion of the condensation product with the colophony ester furnishes a perfectly clear resin, melting at about 40° C. higher than the ester, and being very satisfactorily soluble in benzine.

Example 9

100 grms. of dammar resin (m. p. 68/75° C. and acid value 24) are dissolved warm or melted in 20 grms. of mineral spirits, and a phenol-formaldehyde condensation product as in Examples 3, 7 and 8, is gradually added at over 100° C. If the operation be properly carried out, the transparency of the dammar resin will scarcely suffer and the product is equally fast to light and soluble, but at the same time has a higher melting point and is harder.

What I claim is:—

1. A process for utilizing non-resin-like condensation products obtained by condensing together a phenol substituted in the para-position by an alkyl radicle and formaldehyde, which consists in reacting such products with substantially neutral resins.

2. A process for utilizing non-resin-like condensation products obtained by condensing together a phenol substituted in the para-position by an alkyl radicle and formaldehyde, which consists in causing such products to react by heating with substantially neutral resins.

3. A process for improving substantially neutral resins which consists in melting such resins together with a non-resin-like condensation product obtained from a phenol with an alkyl radicle in the para-position, which phenol has been condensed by means of formaldehyde.

4. A process for utilizing the non-resin-like condensation products which may be obtained by condensing together a phenol substituted in the para-position by a hydrocarbon residue and formaldehyde, which consists in causing such non-resin-like products to react with substantially neutral organic substances of resin-like character.

5. A process for improving substantially neutral resins, which consists in melting such resins together with a non-resin-like condensation product obtained from a phenol with an alkyl radicle in the para-position, which phenol has been condensed by means of formaldehyde in the presence of an alkaline catalyst.

6. A process for utilizing the non-resin-like products obtained by condensing together in an alkaline medium a phenol substituted in the para-position by a hydrocarbon residue and formaldehyde, which consists in causing such products to react with substantially neutral organic substances of resin-like character.

7. The process which comprises the condensing of a phenol substituted in the para-position by a hydrocarbon residue with formaldehyde in an alkaline medium to produce a non-resin-like product, neutralizing the alkalinity and removing the condensation product, and causing such condensation product to act on substantially neutral organic substances of resin-like character.

8. The process which comprises the condensation of a phenol substituted in the para-position by a hydrocarbon residue with more than an equi-molecular amount of formaldehyde in an alkaline medium to a non-resin-like product, neutralizing the alkalinity and removing the condensation products and causing such condensation products to react with substantially neutral organic substances of resin-like character.

9. The product obtained by reacting a substantially neutral resin and a non-resin-like condensation product which may be obtained from a phenol with an alkyl radicle substituted in the para-position.

10. The product obtained by reacting a substantially neutral resin and a non-resin-like condensation product which may be obtained from a phenol with a hydrocarbon radicle substituted in the para-position.

11. The product obtained by reacting a substantially neutral resin and a non-resin-like condensation product obtained from a phenol with an alkyl radicle substituted in the para-position, which substituted phenol has been condensed by means of formaldehyde in the presence of an alkaline catalyst.

12. The product resulting from the process defined in claim 2.

13. The product resulting from the process defined in claim 7.

14. The product resulting from the process defined in claim 8.

In testimony whereof I have hereunto set my hand.

HERBERT HÖNEL.